3,202,480
IMPROVED STRENGTH LOW DENSITY ALUMINA SPHERES

William G. Nixon, Westchester, Ill., assignor to Universal Oil Products Company, Des Plaines, Ill., a corporation of Delaware
No Drawing. Filed Apr. 6, 1961, Ser. No. 101,058
2 Claims. (Cl. 23—143)

The present invention is directed to a method for obtaining high strength alumina particles or spheres for use as a catalyst base and more particularly to a means for increasing the strength of alumina spheres of a low density type.

As is known, catalysis is a mechanism which is not always fully understood and in many instances unpredictable from the aspect of activity, stability, etc. Minor variations in physical characteristics and/or composition may provide substantial differences in improving the efficiency or usefulness in connection with a particular conversion. It has presently been discovered that low density alumina spheres which have been impregnated with one or more catalytically active metallic components provide improved oxidation catalysts for the treatment and conversion of noxious exhaust gases. Higher density alumina particles, even though impregnated with identical activating compounds, tend to become more rapidly deactivated, and especially in the presence of lead components which may be found in automobile exhaust streams resulting from the use of burning lead-containing fuels. Low density particles, however, have a tendency to be of lesser strength than high density particles, as well as be subject to more rapid attrition. Also, inasmuch as catalytic converters for auto exhaust streams are attached to the vehicle, it is necessary that the catalyst particles in the converter be capable of withstanding a certain amount of jarring and movement without excessive breakage and attrition.

It is therefore a principal object of the present invention to provide an improved strength alumina base of the low density type.

It is also an object of the present invention to provide low density alumina spheres of improved strength characteristics by the relatively simple procedure of adding a bromine compound to the alumina sol prior to the formation of aged and dried hydrogel spheres.

Although low density alumina spheres have been found to be particularly useful as a base for activated catalyst, such as used in the conversion of auto exhaust streams, it is not intended to limit the present invention to the formation of alumina spheres for any particular conversion operation. Such spheres may be used to advantage in the formation of various types of catalysts for varying uses, including hydrocarbon conversions, such as hydrogenation, dehydrogenation, reforming, hydrocracking, catalytic cracking, and the like.

Reference may be made to James Hoekstra Patent No. 2,620,314, issued December 2, 1952, for a teaching of means for preparing alumina spheres for use as a catalyst base. Such reference does not, however, provide any teaching of the present invention which embodies the addition of a bromine compound during the formation stage that will in turn provide improved strength spheres.

In a broad aspect, the present invention provides a method for forming improved strength low density alumina spheres for use as a catalyst base which comprises forming an alumina sol, adding a bromine compound thereto and increasing the halogen content of said sol, passing droplets while below gelation conditions into at least one liquid bath and forming hydrogel spheres therein, withdrawing the hydrogel spheres and subsequently aging and drying such spheres at conditions effecting the removal of the bromine content therefrom and providing resulting improved strength alumina spheres.

In another embodiment, the invention provides a method for forming improved strength low density alumina spheres for use as an oxidation catalyst base which comprises, forming an alumina sol by the digestion of aluminum with an acidic chlorine compound at conditions providing a resulting alumina sol with a ratio of aluminum metal to chloride therein of about 1.15 to about 1.50, adding a bromine compound to the sol and increasing the halogen content thereof to provide a reduced ratio of aluminum metal to total halogen present, subsequently adding a solution of water and hexamethylene tetramine to the sol in an amount maintaining the sol below gelation conditions, passing droplets of the sol into an oil bath to form hydrogel spheres, thereafter aging and drying the resulting spheres and forming improved strength alumina spheres having an apparent bulk density less than about 0.4 gram per cubic centimeter.

Where an oxidation catalyst is provided for the conversion of noxious exhaust streams, the refractory alumina base of low density may be composited with, or impregnated with, one or more of the following: vanadium, chromium, molybdenum, tungsten, members of the iron-group of metals and members of the platinum group of metals of the Periodic Table, as well as copper, silver and gold. A particular metal may be used in and of itself, or in combination with any of the foregoing metals; however, platinum is preferably used by reasons of sustained high activity. Other catalytic components may comprise metals selected from the Groups I–B, V–A, VI–A and VIII of the Periodic Table. It is to be understood that the catalytic activity, thermal stability, lead stability, auto-initiating temperature, and other characteristics of the various resulting catalysts are not necessarily equivalent.

The catalyst to be employed for the conversion of an automobile exhaust stream may be placed in a suitable container or catalytic converter and installed within the exhaust gas line. The catalytic converter may be designed to have a straight-through flow, a cross-flow, or a radial flow and may be used alone or in combination with a conventional type of acoustic muffler. Generally combustion air is injected ahead of the converter inlet by the use of an aspirator means, or by some external compressive means.

In the treatment of other types of exhaust streams, the catalyst may be disposed within a fixed bed in a reactor, or in an outlet duct from the chamber in which the noxious products are formed.

An alumina sol may be prepared by digesting aluminum metal in hydrochloric acid or aluminum chloride within suitable digestion chambers. In other instances aluminum metal may be put into solution to form a sol by the use of various promoters in water such as, for example, by the use of water and mercury. Generally an alumina sol that will result in a usable hydrogel sphere will have a weight ratio of aluminum to chloride within the range of about .75 to about 1.75. It has also been discovered that a control of the density may be obtained by regulating the aluminum to chloride ratio (hereinafter referred to as the Al/Cl ratio), such that the ratio is of the order of about 1.15 to about 1.50 in order to obtain low density spheres after aging and drying. As set forth in the aforementioned Hoekstra patent other means may be utilized to control density as, for example, high density spheres tend to result from aging the alumina hydrogel particles in a weak base. Intermediate density spheres were obtained by aging in a liquid bath of increased ammonium hydroxide content, while still lower density spheres will be aged in a solution containing a still higher concentration of ammonia, of the order of 4% to 5%. In addition to the pH of the aging solution having an effect upon the density, there are measurable effects due to variations in temperatures of the oil and water aging baths, and variations in the length of the aging periods.

Improved hydrogel spheres are provided by the addition of ammonium hydroxide or other alkaline material which has a greater buffering effect so as to provide a basic medium which tends to slow down the gelation of a sol to a hydrogel. A preferred operation utilizes hexamethylene tetramine as a basic medium to control the gelation of the hydrosol, with the hexamethylene tetramine being added as a solution containing from about 15% to about 40% of the hexamethylene tetramine in such solution.

In the sphere formation procedure, the alumina hydrosol has the hexamethylene tetramine added thereto prior to passing the sol to suitable dropping means and into a liquid bath, so as to control the formation of particles that will subsequently result in relatively stable spheres not easily fractured during the drying and calcining steps. Preferably, the droplets will fall into an oil bath and be held therein for a period of time sufficient to obtain relatively stable spherically shaped particles. From the oil bath the spherical particles pass to a water bath for further aging and washing, and then from the latter step to a drying means. In each instance the oil bath and water aging steps are carried out for at least about four hours, but in some instances may be substantially longer.

While the foregoing provides the conventional method for effecting the formation of alumina spheres of a satisfactory type, it has been found, in accordance with the present invention, that improved high strength low density spheres may be obtained by the addition of bromine or bromine compound to the sol. The bromine compound is preferably added to the alumina sol prior to the dropping of the sol to form spheres in a liquid bath, or during the formation period, while effecting digestion of the aluminum. Thus, where lower density spheres of less than about 0.4 gram per centimeter are obtained by utilizing aluminum to chloride ratio in the range of 1.15 to 1.50, the bromine compound is added to increase the total halogen content, or the equivalent chloride content, such that there is a total reduction in the aluminum to halogen ratio. For example, having formed an alumina sol with an Al/Cl ratio of about 1.39, bromide may be added to the sol as hydrobromic acid and lower the equivalent Al/Cl ratio to about 1.20 to 1.25. The sol may then be formed into droplets and resulting hydrogel spheres in the conventional heretofore described manner to provide spheres of alumina suitable for a catalyst base. The resulting bromide treated particles will provide higher strength spheres subject to less breakage and attrition than will alumina spheres made in a similar manner without bromide addition. It has been found, however, that bromine is not retained in the alumina spheres after the aged particles have been subjected to the usual heating and drying steps. Certain of the halogens as, for example, chlorine and fluorine, will be retained in the resulting alumina where there has been the addition of such compounds to the sol. However, in the case of bromide compounds, the bromine is driven off and there is no residual amount left in the dried spheres, particularly after impregnation with a catalytic component and subsequent calcination.

An acidic oxide, such as titania or zirconia, compounded with the alumina normally imparts some acidic properties to the catalytic support, however, where desired, a halogen or phosphorus, may be combined with the composite support to provide a further acidic constituent, and may be added in any suitable manner, either before or after the incorporation of the catalytically active metallic component to the support. The addition of halogen is generally accomplished through the use of an acid such as hydrogen fluoride and/or hydrogen chloride, or volatile salts such as ammonium fluoride and/or ammonium chloride. The halogen may be incorporated into the alumina during the preparation of the latter, as where the refractory inorganic oxide is prepared from a halide-containing hydrosol. Such a method affords a convenient manner of compositing halogen while at the same time manufacturing the alumina. In still another method of manufacture, the halogen may be composited with the refractory oxide during the impregnation thereof with the catalytically active metallic components. Thus, where the low density alumina is prepared from an alumina hydrosol having an aluminum to chloride weight ratio in excess of 1.3, the use of such method readily incorporates chloride, where the latter is desired as the halogen. Phosphorus may be incorporated with the composite by the use of a phosphate or acid phosphate salt, such as phosphoric acid, suitably composited with the refractory carrier.

The term "alumina," as used herein, is intended to include porous aluminum oxide in the various states of hydration. However, in addition to alumina, an improved strength low density catalyst base may have at least one other refractory inorganic oxide in connection with the alumina. For example, an oxide of titanium, zirconium, hafnium or a mixture of two or more such oxides may be incorporated with the alumina. The addition or incorporation of any of these inorganic oxides generally improves the physical and/or chemical characteristics. The added oxide or oxides will generally be present within the alumina in an amount within the range of 0.5% to about 20% by weight thereof. Intermediate quantities are preferred and will be normally within the range of about 1.0% to about 10.0% by weight. The additional oxide or oxides may be effectively incorporated with the alumina by adding a water soluble salt of the component into the alumina sol. For example, titanium tetrachloride or zirconyl chloride may be added to the alumina sol prior to its dropping from the tips in the preparation of alumina spheres.

It is not intended to limit the bromide addition to any one bromine compound as, for example hydrobromic acid, inasmuch as gaseous bromine, or a solution of aluminum bromide may be used. Also, a bromide compound may be added during the formation of the sol, rather than afterward. For instance, hydrobromic acid may be added to hydrochloric acid used in effecting the digestion of metallic aluminum and the formation of the sol.

The following examples serve to more clearly set forth the advantage of introducing a bromine compound into the sol to provide improved strength alumina spheres. In order to provide a basis of comparison for resulting alumina spheres, samples were subjected to a high temperature steaming test and two different attrition tests, namely, a modified American Cyanamid test and a ball mill test.

In the high temperature steaming test, a 70 cc. sample of alumina spheres is placed in an Alundum crucible within an electrical muffle furnace and subjected to a temperature of the order of 1800° F. The sample is held at this temperature for a three hour period and at the same time is subjected to the action of steam which is continuously introduced into contact therewith in the furnace. Approximately 60 cc. of water is introduced, as steam, to the sample in the three hour period.

In the modified American Cyanamid Co. attrition test approximately 25 cc. sample of alumina spheres is placed into a jet stream elutriator-dust collector apparatus. The device has a vertical lower tube 1½" I.D. x 27½" long, into which the sample is placed, and a larger upper cylinder that is approximately 5" I.D. x 22" long. Above the latter section is a connecting flask and thimble for collecting fines. Room temperature, saturated air at 75 p.s.i.g. and at the rate of 15 cubic feet per hour is introduced through three orifices in the bottom of the lower tube such that the particles are subjected to vertically rising jet streams for a one-half hour period. The particles together with all fines from the upper dust-collecting portions were collected and subjected to screening to determine the extent of "fines" which were produced by the attrition action of the air jets.

for Example II, with diluted hydrobromic acid being added to the sol to change the Al/Cl ratio from 1.41 to an equivalent Al/Cl ratio of 1.25. The resulting spheres had a bulk density of 0.25 gram per cc. and the results from the testing of samples of this base are likewise set forth in the accompanying Table I for comparison purposes.

*Table I*

| Alumina Base | Steaming at 1,800° F. 3 Hours Percent Fines through 20 Mesh | American Cyanamid Co. Test, Modified | | | Ball Mill Test | | |
|---|---|---|---|---|---|---|---|
| | | Retained on 20 Mesh Screen, Percent | Retained on 30 Mesh Screen, Percent | Passed through 30 Mesh Screen, Percent | Retained on 20 Mesh Screen, Percent | Retained on 30 Mesh Screen, Percent | Passed through 30 Mesh Screen, Percent |
| A | 2.9 | 91.4 | Nil | 8.6 | 87.5 | 6.9 | 5.6 |
| B | 0.0 | 96.2 | Nil | 3.8 | 89.4 | 5.3 | 5.3 |
| C | 11.0 | 97.7 | Nil | 2.3 | 66.4 | 15.7 | 17.9 |
| D | 5.9 | 98.5 | Nil | 1.5 | 89.0 | 5.5 | 5.5 |

The "ball mill" attrition test subjected a 25 cc. sample of spheres to breakage and attrition by placing the sample in a standard laboratory ball mill apparatus using a rotating 1 liter capacity cylinder with three enclosed ½" by 2" steel rods or rollers. The cylinder was rotated for a period of one minute and the sample then subjected to screening to determine the extent of "fines" which were produced by the rollers in the apparatus.

EXAMPLE I

Alumina spheres suitable for catalyst base, designated as "A," were prepared by the dropping of an alumina sol into an oil bath to form hydrogel spheres which were subsequently oil aged for about four hours, water-aged for about 4 hours, dried at a temperature of the order of 400° F. and then calcined at 1000° F. The sol had been prepared by digesting aluminum in hydrochloric acid to provide a resulting Al/Cl ratio of the order of 1.21, and had combined therewith an approximately 30% solution of hexamethylene tetramine in an amount to provide a volume ratio of about two-thirds sol to one-third hexamethylene tetramine. After preparation, samples of the alumina spheres, having an apparent bulk density of 0.25 gram per cc., were subjected to the aforedescribed steaming and attrition tests and the results tabulated in the following Table I.

EXAMPLE II

Alumina spheres suitable for catalyst base, and designated as "B," were prepared as set forth for spheres "A" except that prior to the dropping step, the sol had added thereto 48% hydrobromic acid (diluted with water in the ratio of 33 cc. of acid to 107 cc. of water) to form a sol in which the halogen content was increased and effect an equivalent Al/Cl ratio of 1.25. Samples of the resulting spheres, having a bulk density of 0.25 gram per cc., were subjected to the testing procedures described and the results tabulated in Table I for comparison purposes.

EXAMPLE III

Another sample of alumina spheres, designated as "C," were prepared in a manner similar to that set forth in Example I, except that the alumina sol had incorporated therewith a small quantity of zirconyl chloride solution in an amount providing a resulting alumina base with a zirconia content of 1.5% by weight of the alumina. Samples of the alumina spheres after drying and calcining, and having an apparent bulk density of 0.27 gram per cubic centimeter, were subjected to the same testing procedures and the results tabulated in the Table I.

EXAMPLE IV

Still another batch of alumina spheres, designated as "D," were prepared in a manner similar to that set forth A comparison of the results indicates that there is substantially less attrition to the bromide treated alumina and that higher strength low density spheres may be obtained by bromide addition prior to the forming stage.

Where the improved strength alumina spheres are used as a base for an auto exhaust gas oxidation catalyst, then the alumina may be impregnated or composited with an oxidizing component such as platinum. In a preferred preparation procedure, chloroplatinic acid solution in an amount providing from about 0.05% to 1.0% platinum, by weight of the alumina, will provide a highly active oxidation catalyst capable of converting waste gas streams with a high degree of efficiency. As hereinbefore set forth, the oxidation catalyst may be placed in a suitable reactor or converter such that the gas stream to be treated will uniformly contact the catalyst bed in the presence of added air or oxygen.

In the foregoing examples, the alumina spheres were aged under substantially atmospheric conditions, however, pressure aging may be utilized in the preparation procedure with variations being effected between aging temperature and periods of time. In other words, it is not intended to limit the bromide addition improvement of the present invention to any one predetermined set of conditions.

I claim as my invention:

1. A method for producing improved strength low density alumina spheres which comprises digesting aluminum in an acidic chlorine compound to form a resulting alumina sol having a ratio of aluminum metal to chloride of from about 1.15 to about 1.50, adding hydrogen bromide and water to said sol to increase the halogen content thereof and provide a reduced ratio of aluminum metal to total halogen present, adding an alkaline material having a buffering effect which slows down gelation of the sol and maintains it below gelation conditions, passing droplets of said sol into an oil bath and forming hydrogel spheres therein, thereafter aging and drying to completely drive off bromine from the resulting spheres to form improved strength alumina spheres.

2. A method for producing improved strength alumina spheres having a low density of less than about 0.4 gram per cubic centimeter, which comprises, digesting aluminum in an acidic chlorine compound to form a resulting sol having a ratio of aluminum metal to chloride of from about 1.15 to 1.50, adding hydrobromic acid diluted in water to said sol in an amount to increase the halogen content thereof an deffect a reduced ratio of aluminum metal to total halogen present providing an equivalent aluminum to chloride ratio of less than about 1.30, adding a solution of hexamethyl tetramine to said sol in an amount to maintain the mixture below gelation conditions, subsequently passing droplets of said sol into an oil bath to form hydrogel spheres, successively aging such spheres in oil and in water for at least about four hours in each, and thereafter heating and drying to completely drive off bromine from the resulting hydrogel spheres to form improved strength alumina spheres.

References Cited by the Examiner

UNITED STATES PATENTS

| | | | |
|---|---|---|---|
| 2,620,314 | 12/52 | Hoekstra | 252—448 |
| 2,787,522 | 4/57 | Lefrancois | 23—143 |
| 2,871,096 | 1/59 | Hewert et al. | 23—143 |
| 2,872,418 | 2/59 | Hervert et al. | 252—442 |
| 2,897,159 | 7/59 | Hoekstra et al. | 252—448 |
| 2,914,488 | 11/59 | Gilbert | 23—143 X |
| 2,927,087 | 3/60 | Smith | 252—442 |
| 2,942,932 | 6/60 | Elliott | 23—2 |
| 2,942,933 | 6/60 | Batchelder et al. | 23—2 |
| 2,963,449 | 12/60 | Nixon | 252—448 |
| 2,970,892 | 2/61 | Kirshenbaum et al. | 23—143 |
| 2,974,111 | 3/61 | Nixon | 23—143 X |
| 3,020,242 | 2/62 | McCartney et al. | 23—143 X |
| 3,096,295 | 7/63 | Michalko | 23—143 X |

MAURICE A. BRINDISI, *Primary Examiner.*